United States Patent Office

2,955,022
Patented Oct. 4, 1960

2,955,022

CYANOGEN PRODUCTION

Lloyd S. Eubanks, Texas City, Tex., assignor to Monsanto Chemical Company, St. Louis, Mo., a corporation of Delaware No Drawing. Filed Dec. 22, 1958, Ser. No. 781,913

3 Claims. (Cl. 23—151)

This invention relates to the production of cyanogen and more particularly, to the production of cyanogen by the vapor-phase oxidation of hydrogen cyanide.

It is known that if a mixture of air and hydrogen cyanide is contacted with certain catalysts at elevated temperatures, cyanogen can be obtained in good yield. However, the known catalysts are relatively expensive and the temperatures required are quite high, in the range from about 300° C. to about 600° C. Now, it has been discovered that the oxidation reaction may be successfully carried out at considerably lower temperatures and with more economic catalyst compositions.

According to the invention, cyanogen is produced by contacting hydrogen cyanide and air/or oxygen with a cobalt catalyst at a temperature within the range from about 125° C. to about 175° C. The following examples illustrate the invention but are not to be construed as limiting it in any manner whatsoever.

*Example I*

A Pyrex tube about 20 in. long and 1 in. in diameter was employed as a reactor. It was fitted with a coarse fritted glass plate of the same cross-sectional area as the tube positioned in the reactor at about 1 ft. from the top. The reactor was heated by means of resistance wire wrapping covered by the necessary insulation. Temperature in the reactor was measured by means of a mercury-in-glass thermometer inserted through the top of the reactor. A condensate trap and an off-gas scrubber containing a 20% solution of sodium hydroxide were connected to the reactor in that order to collect the reaction products. A bed of a cobalt catalyst about 4 in. in depth was supported in the circular fritted glass plate in the reactor. The catalyst employed consisted of about 3% to 4% by weight of surface-activated cobalt impregnated on alumina in the form of ⅛"×⅛" tablets (manufactured by The Girdler Co. and designated at T–303, Sample No. 2496–A). The catalyst bed was heated to a temperature of about 125° C. and hydrogen cyanide and air at rates of 0.2 and 0.25 gram-mole per hr., respectively, representing a mole ratio of HCN to oxygen of approximately 4:1, were passed over the catalyst for a period of about 15 min. while it was maintained at this temperature. Space velocity was about 4 liters of gas per liter of catalyst per minute corresponding to a contact time of about 5 seconds. The effluent gas after passing through the condensate trap was bubbled through the caustic in the off-gas scrubber. At the end of the reaction period, a sample of the scrubber liquid was analyzed for the cyanate ion. Results were positive indicating that cyanogen was present in the gas and had been produced by the oxidation of HCN. The specificity of this test for cyanogen in such gas mixtures had been previously demonstrated by means of mass spectrometric and infrared analyses of known samples.

*Example II*

The experiment of Example I was repeated both at 150° C. and 175° C. and cyanogen was produced at both temperatures as demonstrated by positive qualitative tests on the scrubber liquid. For verification, samples of the caustic solution alone and the caustic solution into which HCN gas had been bubbled for an equivalent length of time were subjected to the cyanate ion test. Results were negative in both instances.

Some variation in reaction conditions from those exemplified may be made without departing from the scope of the invention. Any temperature, for example, in the range from about 125° C. to about 175° C. may be employed. The temperature range is fairly critical since temperatures much outside this range give little or no cyanogen.

The catalyst carrier may be any inert porous material to which finely divided cobalt metal will adhere. Such materials in addition to alumina include, for example, pumice, kieselguhr, kaolin, fuller's earth, and the like. The catalysts may be prepared by impregnating such an inert carrier material with a thermally unstable cobalt compound such, for example, as cobalt ammonium nitrate and heating the impregnated mass or treating it with a chemical reducing agent. The amount of cobalt distributed on the carrier is not particularly critical. Amounts of cobalt between about 1% and about 10% by weight of the carrier are generally effective. Higher quantities can be utilized but appear to offer no particular advantages. Preferably, the carrier is impregnated with from about 1% to about 5% by weight of the metal. While the example shows a fixed bed catalyst, the process can be conducted as well using the well known fluidized catalyst technique.

Preferably, the ratio of reactants is the stoichiometric one of 4 moles of HCN to one mole of oxygen although other ratios may be employed if desired. Other oxygen-containing gases or oxygen itself may be substituted for air, it being understood that the other constituents of any oxygen-containing gas must be inert under the reaction conditions.

Space velocities are not particularly critical. Optimum space velocities will vary with the temperature and the particle size of the catalyst. Generally, space velocities in the range from about 0.2 min.$^{-1}$ to 80 min.$^{-1}$ are satisfactory with those in the range from about 0.4 min.$^{-1}$ to about 40 min.$^{-1}$ being preferred. Relatively short contact times are employed, those in the range from about 0.25 second to about 100 seconds being generally satisfactory and those from about 0.5 second to about 50 seconds being preferred.

The cyanogen may be separated from the reaction mixture in any known manner. A simple and convenient method, for example, is that of fractional condensation whereby hydrogen cyanide condenses first upon cooling to 25–26° C. and cyanogen is then separated out by cooling the remaining gases to about −20.5° C., the boiling point of cyanogen.

What is claimed is:

1. A process for the production of cyanogen which comprises reacting hydrogen cyanide and air in contact with a cobalt catalyst at a temperature in the range from about 125° C. to about 175° C.

2. A process for the production of cyanogen which comprises reacting hydrogen cyanide and air in quantities such that the mole ratio of hydrogen cyanide to oxygen is 4:1 in contact with cobalt supported on an inert carrier at a temperature in the range from about 125° C. to about 175° C.

3. The process of claim 2 wherein the carrier is alumina.

References Cited in the file of this patent

UNITED STATES PATENTS

| | | |
|---|---|---|
| 1,937,689 | Frazer | Dec. 5, 1933 |
| 2,712,493 | Moje | July 5, 1935 |